Figure 1:
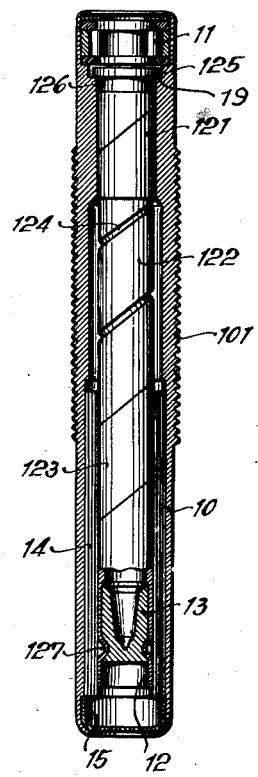

Aug. 7, 1956   E. F. SCHMID   2,757,992
BEARING DEVICE
Filed Feb. 8, 1954

INVENTOR:
ERWIN FRIEDRICH SCHMID
BY:

United States Patent Office 2,757,992
Patented Aug. 7, 1956

2,757,992

BEARING DEVICE

Erwin Friedrich Schmid, Stuttgart, Germany, assignor to SKF Kugellagerfabriken Gesellschaft mit beschränkter Haftung, Schweinfurt, Germany, a company of Germany Application February 8, 1954, Serial No. 408,960

Claims priority, application Germany February 10, 1953

1 Claim. (Cl. 308—152)

The present invention relates to bearing devices. More particularly, the invention relates to a supporting or bearing sleeve for spinning and doubling spindles as used in spinning machinery.

Prior known tubes and bearing sleeves of the above type have been made flexible by providing slots therein, but it has been found that axially extending slots in such sleeves do not reduce the stiffness thereof to a great extent, whereas it has been found that helically or tangentially arranged slots or cuts have proved quite efficient. However, bearing sleeves formed with such cuts are very costly to manufacture, particularly because the ends of the slots must be machined with extreme care in view of the notch effect, inasmuch as maximum stresses on the bearing sleeve will occur at these points. Experience has shown that material fractures which may cause destruction of the bearing components frequently start at the ends of such incisions.

Axially flexible spindle bearing parts have not been looked on with much favor, and generally axial flexibility must be taken into account only insofar as the prevention of resonances within the speed ranged of the spindle is concerned. The amount of resiliency must be properly controlled by the selection of proper geometrical sizes. Especially in the case where spindle movements are oscillatory the thrust or footstep bearing of the spindle is subjected to radial movements, thereby subjecting the bearing sleeve to a bending stress.

It is an object, therefore, of the present invention to provide a bearing sleeve of the above type which overcomes the disadvantages of the known bearing sleeves.

It is another object of the present invention to provide a bearing sleeve of the above type which is of progressive flexibility from the end thereof holding the spindle thrust bearing to the end seated in the bearing housing.

It is still a further object of the present invention to provide a bearing sleeve of the above type wherein the sleeve is formed of a helically wound strip of resilient material, and wherein the windings at the point of greatest stress are spaced the greatest distance.

Other objects and advantages will become apparent from the following description and the appended claims.

With the above objects in view, the present invention mainly consists in a bearing arrangement which comprises in combination, supporting means, thrust bearing means, and a supporting sleeve consisting of a helically wound strip of resilient material secured at one end to the supporting means and holding at a point spaced from the one end the thrust bearing means facing the interior of the supporting sleeve.

In a preferred embodiment of the invention, the supporting sleeve is provided with windings, preferably one or two windings at the point of greatest bending stress and located inwardly of the press-fitted seat portion of the sleeve, which are spaced from each other while all other windings of the bearing sleeve are close-wound and substantially in contact with each other.

Figure 2:
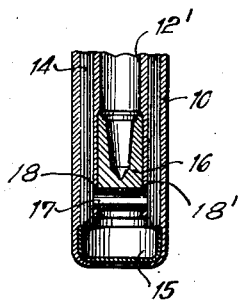

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Fig. 1 is a longitudinal section of a bearing arrangement constructed in accordance with the present invention; and Fig. 2 is a fragmentary longitudinal section of a spindle bearing arrangement similar to that of Fig. 1 showing a different embodiment of the thrust bearing support.

Referring now to the drawing, there is shown an elongated housing 10, at the upper end of which is securely mounted a roller bearing 11 and which has an external thread portion 101 for receiving a flange (not shown) and a lock nut (not shown), thereby providing an arrangement which prevents the outer bearing raceway from moving and which provides a fixed point for centering the spindle.

A supporting or bearing sleeve 12 is press-fitted in the housing 10 along a portion 121 spaced downwardly from the roller bearing 11. Bearing sleeve 12 is formed preferably of a sheet metal strip, and in the arrangement illustrated in the drawing, the windings along the press-fitted portion 121 are close-wound so that no space is left between the adjacent windings in this portion of the bearing sleeve 12. In the portion of the bearing sleeve 12 adjacent to the press-fitted portion 121, the windings 122 are spaced from each other so as to form spaces 124 therebetween. Along the portion of bearing sleeve 12 adjacent to the portion 122 extending toward the lower end of the bearing sleeve, the windings 123 are again closely wound.

As shown in the drawing, the upper close-wound portion 121 of bearing sleeve 12 is somewhat larger in diameter than the spaced-winding portion 122 and the close-wound portion 123. Near the upper end of bearing sleeve 12 adjacent to press-fitted portion 121 the bearing sleeve is formed with a portion 126 which is of reduced diameter, and adjacent thereto at the end of bearing sleeve 12, the sleeve is formed with a radial flange-like portion 125 having an increased diameter. The flange portion 125 serves as a stop for the bearing sleeve 12 by engaging a stepped portion 19 formed in the upper part of bearing housing 10.

The external shape of the bearing sleeve 12, as described above, is preferably manufactured and machined by grinding, using the plunge-cut process. Preferably, the peripheral surface of flange portion 125 is not finished or polished. The bearing sleeve may, if desired, be so formed that the individual sections thereof are wound with different diameters instead of being machined to such form.

At the bottom of bearing sleeve 12 there is provided a thrust or footstep bearing 13 for receiving the spindle (not shown). Thrust bearing 13 is fastened in bearing sleeve 12 by means of a plurality, e. g., three, indentations or projections 127 which are formed in the wall of bearing sleeve 12 projecting inwardly thereof. Thrust bearing 13 is so arranged that bearing sleeve 12 projects somewhat below the thrust bearing so that it is securely held by the projections 127.

Between bearing sleeve 12 and housing 10 a damping coil is arranged, the coil being provided for damping the vibrations produced in the bearing sleeve. At the bottom of housing 10 a cap 15 is provided which is press-fitted into the end of the housing 10 and closes the same.

Bearing sleeve 12 may be of such dimensions, or may be so stressed while it is being wound, that it is made axially inflexible under the action of the rotating spindle parts.

In the operation of the device, the slotted spaces between the turns in the portion 122 serve to provide increased flexibility for the bearing sleeve 12, whereas the close-wound portions of the bearing sleeve behave approximately like a solid tube because no space is provided between the individual windings, so that the bearing sleeve 12 cannot bend between the latter windings in its axial plane, and in order to produce such bending effects a comparatively great force is required.

In accordance with the invention, the turns of the helically wound strip adjacent thrust bearing 13 and the seat of the bearing sleeve 12 in housing 10, i. e., the press-fitted portion 121, are preferably rigidly secured to each other, as by welding, brazing or soldering.

Instead of fastening thrust bearing 13 in position within bearing sleeve 12 by means of projections 127, the thrust bearing may be fastened by other means. Fig. 2 shows a different embodiment of the thrust bearing fastening, wherein thrust bearing 16 is held in place by means of a pin 17 extending along the bottom thereof and passing through opposite apertures 18—18′ in the bearing sleeve 12′. The opposite ends of pin 17 are calked in bearing sleeve 12′.

By virtue of the construction of the bearing or supporting sleeve as described above and in accordance with the invention, wherein the sleeve is formed of a helically wound strip, there is no danger of cracking or other damage to the bearing sleeve due to any bending stresses to which it is subjected. Furthermore, the manufacture of the sleeves is considerably simplified and made much more economical than is possible in the case of known bearing sleeves of the above type, since the present bearing sleeves can be made in series by a simple winding operation.

Inasmuch as the bearing sleeve 12 is formed from a helically wound strip whose turns are in engagement with each other at the opposite end portions of the bearing sleeve, it is evident that the helical space between the convolutions of the strip at the intermediate part of the sleeve will become gradually narrower and finally close adjacent the ends of the sleeve where the convolutions are in engagement with each other. This is so because it is impossible to place the end turns of the helically wound strip in engagement with each other and then have directly next to these end turns a space between the convolutions which is as wide as the space between the convolutions which are spaced a substantial distance from the ends of the sleeve. As a result, the bearing sleeve of the invention will have its greatest flexibility at the intermediate portion thereof where the helical space between the successive turns is greatest. As this helical space approaches the ends of the sleeve, the space becomes gradually narrower and finally closes so that the yieldability of the sleeve gradually diminishes toward the ends thereof. This feature is of considerable advantage because there is a gradual change in the stress of the sleeve between its end portions and its intermediate portion. If the helical space between the intermediate convolutions of the sleeve were of constant width and suddenly closed at the ends of the sleeve, there would be a very sudden change in the stress to which the sleeve is subject at the places where such a helical space ends, and with such a sudden change in the stress the sleeve could not resist the stresses to which it is subject with the efficiency and reliability with which the bearing sleeve of the invention can resist these stresses.

It will be understood that each of the elements described above, or two or more together, may also find a useful application in other types of bearing devices differing from the types described above.

While the invention has been illustrated and described as embodied in bearing sleeve for spindles of spinning machinery, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A bearing arrangement comprising, in combination, tubular supporting means; thrust bearing means; and an elongated hollow supporting sleeve consisting of a helically wound strip of resilient material arranged within and secured at one end portion to said tubular supporting means and holding at another portion spaced a substantial distance axially from said one end portion said thrust bearing means facing the interior of said hollow supporting sleeve, the consecutive turns along an intermediate portion of said wound strip of resilient material between said one end portion and said other portion thereof being spaced from each other to provide a helical gap along said sleeve in said intermediate portion thereof and the turns of said strip at said one end portion and said other portion thereof engaging each other, said helical gap becoming gradually narrower as it approaches said one end portion and said other portion of said sleeve, whereby the yieldability of said sleeve is at a maximum at said intermediate portion of said sleeve and gradually reduces as the turns of said sleeve approach said one end portion and said other portion thereof.

References Cited in the file of this patent
UNITED STATES PATENTS

| | | |
|---|---|---|
| 357,904 | Chapman | Feb. 15, 1889 |
| 875,503 | Chapman | Dec. 31, 1907 |
| 2,486,296 | Laird | Oct. 25, 1949 |
| 2,611,666 | Hoffman | Sept. 23, 1952 |

FOREIGN PATENTS

| | | |
|---|---|---|
| 120,096 | Great Britain | Oct. 28, 1918 |
| 206,117 | Great Britain | May 1, 1924 |
| 251,698 | Great Britain | May 6, 1926 |